US005453327A

United States Patent [19]

Strauss

[11] Patent Number: 5,453,327

[45] Date of Patent: Sep. 26, 1995

[54] FLEXIBLE WOOD ARTICLE AND METHOD OF ITS PREPARATION

[76] Inventor: Robert E. Strauss, 2936 Chapel Hill Rd., Orange, Calif. 92667

[21] Appl. No.: 327,575

[22] Filed: Oct. 24, 1994

Related U.S. Application Data

[63] Continuation of Ser. No. 95,547, Jul. 26, 1993, Pat. No. 5,360,631.

[51] Int. Cl.$^{6}$ .............................. B32B 23/08; B32B 27/10

[52] U.S. Cl. ......................... 428/511; 428/537.1; 428/541

[58] Field of Search .................................... 428/511, 512, 428/513, 537.1, 541; 744/254, 327; 427/154, 325, 393

[56] References Cited

U.S. PATENT DOCUMENTS

| | | | |
|---|---|---|---|
| 2,546,705 | 3/1951 | Strawinski | 428/511 |
| 3,282,313 | 11/1966 | Schuerch | 144/327 |
| 3,894,569 | 7/1975 | Hutteinen | 144/327 |
| 4,148,987 | 4/1979 | Winey | 427/440 |
| 4,225,637 | 9/1980 | Richardson | 427/440 |
| 4,259,378 | 3/1981 | Richardson | 427/440 |
| 4,606,388 | 8/1986 | Favot | 427/297 |
| 4,678,686 | 7/1987 | Park | 427/254 |
| 4,898,788 | 2/1990 | Minami et al. | 427/325 |

OTHER PUBLICATIONS

Bill Keenan, *Bending With Ammonia,* Fine Woodworking Techniques No. 5, p. 191, Taunton Press, 1983.

*Primary Examiner*—Shrive Beck
*Assistant Examiner*—Brian K. Talbot
*Attorney, Agent, or Firm*—John E. Vanderburgh; Thomas J. Plante

[57] ABSTRACT

There is disclosed a method for the ammonia saturation of wood to impart flexibility thereto which includes the step of sealing the surfaces of ammonia-saturated wood with a polymeric film which has limited or no permeability to either or both ammonia and water vapor. Preferably, the polymeric film is flexible so the working of the wood product by bending, twisting, embossing, molding, etc. will not destroy the film. The polymeric film should also be soluble in a selected solvent, thereby permitting its removal after the wood has been formed in a final, desired shape to permit water vapor to re-establish crosslinking of the cellulose chains and restore its natural, rigid condition.

10 Claims, No Drawings

FLEXIBLE WOOD ARTICLE AND METHOD OF ITS PREPARATION

This is a continuation of application Ser. No. 08/095,547, filed Jul. 26, 1993 now U.S. Pat. No. 5,360,631.

BACKGROUND OF THE INVENTION

1. Field of Invention

This invention relates to a new wood product which is flexible and to a method for its preparation.

2. Brief Statement of the Prior Art

Until recently, the only method to impart flexibility to wood was to saturate the wood with water or steam. This treatment achieves only limited flexibility, and must be combined with extensive mechanical application of force with clamps and presses.

Some attention has focused on use of ammonia to bend wood. In *Bending With Ammonia*, Fine Woodworking Techniques No. 5, p.191, Taunton Press, 1983, it is reported that the treatment of wood with anhydrous ammonia at 135 psi. for 45 minutes will impart flexibility to the wood so that when the wood is removed from the ammoniation chamber, it can be bent or twisted over a working period of about 45 minutes, before it becomes rigid. Wood sheets of thicknesses up to ¼ inch reportedly have been treated in this manner.

Unfortunately, the flexibility which is imparted to wood by treatment with anhydrous ammonia is only temporary, and of limited usefulness as it is not practical to install complex pressure ammoniation equipment in wood working shops. The method has limited commercial potential since is does not impart flexibility to wood for prolonged periods necessary to permit the storage, and shipment of "flexible" wood to an end user such as a furniture or cabinet maker, boat builder, finish carpenter, etc.

OBJECTIVES OF THE INVENTION

It is an object of this invention to provide a flexible wood article.

It is a further object of this invention to provide durable flexibility to wood.

It is a still further object of this invention to provide a flexible wood product which can be supplied to end users in a flexible form.

It is an additional object of this invention to provide a flexible wood product which can be restored to its natural, rigid condition after it has been formed into a desired shape.

It is also an object of this invention to provide a method for the safe handling of ammonia-treated wood.

Other and related objects will be apparent from the following description of the invention.

BRIEF STATEMENT OF THE INVENTION

This invention comprises a method for the ammonia saturation of wood to impart flexibility thereto which includes the step of sealing the surfaces of the ammonia-treated wood with a polymeric film which has limited or no permeability to either or both ammonia and water vapor. Preferably, the polymeric film is flexible so the working of the wood product by bending, twisting, embossing, molding, etc. will not destroy the film. The polymeric film should also be soluble in a selected solvent, thereby permitting its removal after the wood has been formed in a final, desired shape to permit water vapor to re-establish crosslinking of the cellulose chains and restore its natural, rigid condition.

DESCRIPTION OF PREFERRED EMBODIMENTS

The rigidity of wood is the result of crosslinking between adjacent cellulose chains by water molecules which hydrogen bond between sites on adjacent cellulose chains. Anhydrous ammonia is extremely reactive with water, and it is believed that anhydrous ammonia scavengers water from wood, breaking the crooslinking between cellulose chains, and permitting the cellulose chains to slide, which renders the wood very flexible so that it can readily be bent or twisted. When the ammonia volatilizes from the treated wood, water vapor reestablishes crosslinking and rigidity.

The invention comprises a flexible wood product and a method for its preparation. The wood is rendered flexible by saturation with anhydrous ammonia, and for this purpose, treatment with ammonia-rich gases can be performed at pressures from atmospheric pressure to 200 psi., preferably from 25 to about 150 psi. The treatment can be performed in any closed vessel resistant to corrosion by ammonia, and for this purpose, mild or stainless steel are suitable.

Preferably the wood to be treated is placed in the ammoniation chamber and the chamber is evacuated to remove substantially all air and water vapor. Green or unseasoned wood can be used directly in the treatment. Air or kiln dried wood is preferably treated with water vapor to swell its pores and thereby increase its porosity for the ammonia treatment. Suitable water contents of the wood can be from 10 to 150 percent, preferably from 15 to about 25 percent water. The treatment of the wood with water vapor can be conducted in a humidification chamber, sealed to the atmosphere and at or near 100% relative humidity by injection of steam or water vapor.

The thickness of the wood can vary considerably, depending on the severity of the ammoniation treatment. Generally thicknesses up to about 3/16 inch can be treated effectively at relatively mild conditions, while greater thicknesses will require greater pressures and/or longer treatment times in the ammoniation chamber. A very suitable thickness which is useful for most applications, including laminating to greater dimensions, is from 1/16 to 3/16 inch. The width and length of the wood is without limitation, other than the physical constraints of the dimensions of the chamber which is used for the ammonia treatment.

For practical applications, the ammonia treatment is at superatmospheric pressures, preferably up to about 200 psi. and at temperatures from ambient (70° F.) to about 250° F. Care should be taken to avoid temperatures so elevated that the appearance of the wood is impaired by excessive darkening. A practical range of treatment conditions is from 35 to 150 psi. pressure at a temperature from 70° to 125° F.

The treatment gas is preferably pure or substantially pure anhydrous ammonia, and this is achieved by evacuating the chamber after the wood is placed within the chamber and the chamber is sealed. This will also purge the wood of some of its moisture content.

The wood is permitted to remain in the ammoniation chamber under the aforesaid conditions of pressure and temperature for sufficient time to impart the desired flexibility to the wood. This depends on the severity of the conditions and the thickness of the wood. Treatment times from 15 minutes to 10 hours can be used. A preferred time range is from 25 minutes to about 3 hours for wood having a thickness from 1/16 to 3/16 inch and ammonia pressure of 15 to about 150 psig. With thicker pieces of wood or less severe conditions, the treatment can be extended to several days, if necessary. Such extended treatment times, however, are not entirely practical or economical.

The penetration of anhydrous ammonia into the structure of the wood can be facilitated by puncturing the wood surface with a plurality of closely spaced, small diameter, rigid pins with sharpened ends. Useful pins have diameters from 0.001 to 0.05 inch. The pins can be mounted on a block or plate, e.g., a bed of pins, and can be forced into one or more surfaces of the wood article to increase the surface exposed to the ammonia and hasten its penetration into the wood structure. The process can be practiced continuously be running the wood sheet between opposed rollers of which either or both have surfaces of closely spaced pins to puncture the wood surface, embedding the pins to a depth of 1/32 to about 1/8 inch. This treatment would not likely be applied to a surface which is to be finished or exposed on the final wood product, but is entirely suitable when the wood is to be laminated between other wood layers, or when applied to only one side of the wood.

After the wood article has become flexible from treatment with anhydrous ammonia, it is treated to seal its surfaces with a polymeric film which is impervious to either or both ammonia and water vapor. This treatment is preferably conducted in a chamber which is free of water vapor, and which, preferably is saturated with anhydrous ammonia, to insure that the wood does not loose any of its flexibility before its surfaces are sealed by the polymeric film. When preformed films are applied, such as heat shrinkable films, the treatment can be practiced in the atmosphere, provided that the film is applied before the water vapor can restore the natural rigid state of the wood, usually a period from 15 to 35 minutes.

The polymeric film can be applied as a solution of a film forming polymer in a suitable solvent, or it can be applied as a preformed film. When a coating composition is used, it can be sprayed or brushed onto the surfaces of the ammonia-treated wood, or the wood article can be dipped into a bath of the coating composition. Also, some polymers can be applied as particle coatings by vapor deposition. The thicknesses of the coatings applied by these methods will vary, depending on the viscosity of the composition and the application method. Coatings of films having thicknesses from 0.0005 to 0.005 inch are suitable, with thicknesses from 1 to 2 mils being typical.

Various film forming polymers can be used to seal the treated wood and prevent penetration by water vapor. Examples of suitable polymers which can be obtained in thin film form and which have excellent water vapor barrier properties are set out in the following table with specific rates of water vapor transmission (grams per mil per 1000 square inches per day):

TABLE

| Polymer | Water Vapor Transmission Rate |
|---|---|
| regenerated cellulose (cellophane): | 0.4 |
| ethylene-chlorotrifluoro-ethylene copolymer: | 0.6 |
| polytetrafluoroethylene: | 0.04 |
| polypropylene: | 0.7 |
| polypropylene (biaxial): | 0.25 |
| polyvinyl alcohol: | 0.1 (gm/mm/m$^2$/day) |
| vinylidene chloride vinyl chloride copolymer: | 0.2 |
| fluorinated ethylene propylene copolymers: | 0.4 |
| polytrifluorochloroethylene copolymer: | 0.025 |
| polyethylene, high density: | 0.7 |
| polyvinyl chloride non-plastized: | 0.35 (gm/mm/m$^2$/day) |
| rubber hydrochloride: | 0.007 |

In addition to the foregoing, the following polymers also provide excellent water vapor barriers: polycarbonates, acrylonitrile-styrene-butadiene copolymers, methylmethacrylate-grafted acrylonitrile-styrene-butadiene copolymers, methylmethacrylate-grafted acrylonitrile-butadiene copolymers, methylmethacrylate-grafted acrylonitrile-styrene copolymers.

Also useful are coextrusions of various polymers, e.g., a coextrusion of ethylene-vinyl acetate copolymer and an acrylonitrile-styrene-butadiene copolymer with a minor quantity of an adhesive polymer such as ethylene-acrylic acid polymer to enhance homogeneity and prevent separation of the coextruded polymers.

An example of a coating composition which will provide a high resistance to water vapor is polyvinylidene chloride which is copolymerized with vinyl chloride for flexibility. Other comonomers can be included to enhance flexibility and elasticity, e.g., acrylate and methacrylate esters, e.g., ethyl methacrylate. This terpolymer can be prepared by solution polymerization in a suitable solvent, e.g., hexane, to form a coating composition which can be applied to the ammonia-saturated wood while the wood is retained in an anhydrous atmosphere.

In instances where a single polymer or copolymer lacks adequately high barrier properties for either water vapor or ammonia, two or more film barriers can be combined to seal the treated wood sufficiently that it will have an adequate shelf life for most commercial applications.

Polyvinyl alcohol films provide excellent barriers to ammonia transmission. Polyvinyl alcohol is used in aqueous suspensions as a coating agent, which limits its usefulness for the initial coating of the treated wood. Accordingly, the treated wood can be first coated with a water barrier film by coating with an organic solution or suspension of copolymers of vinylidene and vinyl chlorides, or their terpolymers with minor amounts of acrylic monomers, in an ammonia-rich atmosphere. After the coating has cured into a water barrier film, the treated wood is removed from the ammonia-rich atmosphere, and is immediately coated with a polyvinyl alcohol film. The vinylidene/vinyl chloride polymer film coating serves as a water barrier permitting use of an aqueous suspension of polyvinyl alcohol, and also has a high resistance to ammonia transmission, thereby preventing rapid depletion of the ammonia from the pores of the wood. The polyvinyl alcohol film will provide a permanent barrier to ammonia transmission, thereby sealing the ammonia in the wood for prolonged periods. The polyvinyl alcohol film also is an effective barrier to transmission of water vapor, particularly when at least one side of the film is exposed to low humidity. In this application, the wood side of the film is substantially anhydrous, resulting in a polyvinyl alcohol film which is highly resistant to water vapor transmission.

If desired, the vinyl alcohol may also be copolymerized with ethylene to increase water resistance and can be crosslinked with a polyol, e.g., glycerine, to increase the strength of its films.

In other instances, the most desirable polymer may not be readily available as a coating composition, e.g., rubber hydrochloride, or the aforementioned coextrusions of blends of two or more polymers. In those instances, the polymer can be applied to the wood as a sheet film which is sealed by thermal or solvent fusion.

In most commercial applications, it is desirable to seal the coated and treated wood in a protective wrap of a strong, but flexible outer film. Any of the aforementioned polymers can be used in sufficient thickness to provide a desired high abrasion and tear resistance, e.g., from 1 to about 5 mils (0.001–0.005 inch) thickness. When the outer wrap is sealed, it also enhances the resistance of the barrier film coatings to transmission of water vapor and ammonia. Preferably, heat shrink films are used so that the wood article can be wrapped and sealed in a protective outer film, which can then be shrunk tightly about the article.

The flexible wood product can be shipped and stored with normal packaging and handling. If adequately protected, it will have an indefinite shelf life, depending on the identity and thickness of the film coating or coatings. In most commercial applications, however, a shelf life of 6 to 8 months will be adequate.

The end user physically removes the outer protective film and bends, twists, or compresses the wood into its desirable, final shape. This can include compressive molding, or embossing, the wood to simulate carving for carved wood panels useful for doors and drawers, carved table aprons, carved rails or styles for doors and cabinets, etc. The wood can also be bent into tight radius bends, e.g., bends with a radius of 0.5 inch, without breaking or splintering, and with very low clamp loads. In most applications, the wood can be bent into the desired shape with hand pressure, and clamps are only used to prevent sagging of the wood until the permanent stiffness is restored.

The wood is restored to its natural rigid state by removing or breaking the seal of the barrier film coatings. In most applications this can be accomplished simply by dissolving the barrier film in a solvent; water for the polyvinyl alcohol films, and organic solvents for the other films. Once the barrier film is removed, or severely compromised, the wood will revert to its rigid condition within a period of 15 to 60 minutes, and can be treated and finished as any natural, untreated wood.

EXAMPLE 1

An isolation air chamber box is prepared from an aquarium 36 inches by 16 inches by 18 inches, which is provided with a sealed cover, having a single hole in which is sealed a ½ inch diameter sleeve. Two, six inch diameter arm access holes are cut into one side of the box and the holes are fitted with butyl rubber gloves having a 22 inch sleeves, with the cuffs of the sleeves sealed about the access holes. Three small diameter holes are bored in the opposite side wall of the aquarium, and ¼ inch diameter sleeves are sealed in the holes. The necks of rubber latex balloons are attached to the sleeves inside the box.

A 12 inch by 10 inch pan is filled to 1 inch depth with a rubber latex and covered with a plastic film, and also placed in the bottom of the isolation box. A thin panel of basswood, 1/16 inch thick and 8 inches by 6 inches is placed in the isolation box, leaning against one side of the box.

The air within the isolation box is discharged by inflating the balloons, which when inflated occupy substantially the entire vapor space of the box. A cylinder of anhydrous ammonia is connected with flexible tubing to the ½ inch diameter sleeve in the box cover, and ammonia is discharged into the box, deflating the balloons until the entire box is filled with ammonia. The box is then left undisturbed for 12 hours.

After 12 hours the wood panel within the box sags into a curved shape. The plastic film is removed from the pan of rubber latex, and the wood panel is placed in the rubber latex in the pan and retained therein for 15 minutes. The wood panel is then removed, and excess latex is permitted to drain back into the pan, and the wood panel is then placed on its long edge against the wall of the box and left in that position for one hour.

The flexible tube is removed from the ammonia cylinder and is immersed in a 5 gallon plastic container partially filled with water. An air blower is connected to the ¼ inch diameter sleeves and the balloons are again inflated, expelling the ammonia into the plastic jug where it is absorbed by the water. After expelling the ammonia, the box cover is loosed and removed, and the wood panel is removed.

The wood panel is flexible and can be bent and twisted with approximately the same stiffness as cardboard. Initially the wood has a faint ammoniacal odor which is lost after several hours of air exposure. After several days the wood still retains substantially all its initially observed flexibility.

EXAMPLE 2

A chamber similar to that shown in U.S. Pat. 4,924,919 is used for initial treatment of a wood panel in this example. This chamber is approximately 16 inches square by 18 inches high and has a hinged cover which, when closed, seals the interior of the box. The box has a nozzle which is connected to the inlet of a household vacuum permitting evacuation of air from the box. The cover has a fitting to which the neck of a balloon can be attached with provision for expanding the fitting and stretching the balloon neck to an opening with a diameter of approximately 5 inches. A balloon is attached to the fitting and the neck is expanded, the cover is closed, sealing the box and the box is evacuated with the vacuum. The balloon expands into the evacuated chamber within the box, and a panel of bass wood, 1/16th inch thickness by 6 inches square is placed into the balloon through its expanded neck. The vacuum is removed from the box and the neck of the balloon is collapsed. The entire balloon collapses tightly about the wood panel.

A flexible tube from a cylinder of anhydrous ammonia is then connected to the neck, and ammonia is slowly admitted into the balloon, inflating the balloon within the box. When the balloon is fully inflated, the ammonia supply is shut off and the apparatus is maintained in this condition for a period of 8 hours.

At the end of the 8 hour period, it is noted that the wood is highly flexible and the ammonia supply tube is removed from the ammonia cylinder and immersed into a plastic 5-gallon jug partially filled with water. The valve on the neck is opened, permitting the balloon to collapse about the wood panel, expelling the ammonia into the water cylinder. The cover on the box is then opened and the balloon is tied off and removed from the neck of the cover. The isolation box described in Example 1 is prepared for use by placing an open pan of concentrated sulfuric acid in the bottom of the box. The air inlet sleeve is connected with a flexible tube to a glass tube immersed within the sulfuric acid. Additionally, a pan filled with an anhydrous polymeric film forming solution (copolymer of vinylidene and vinyl chlorides) is placed in the bottom of the box and this pan is covered with a plastic film. The cover is placed and sealed on the box and the three balloons in the box are inflated to expel the air from the box. The inlet air valve is then opened and the balloons are permitted to collapse, admitting air through the inlet tube and through the concentrated sulfuric acid bath, to remove all water vapor from the air. The balloon-enveloped wood panel is placed within the box immediately after its removal from the ammoniation chamber and the isolation box is closed and sealed.

The balloon is stripped from the wood panel. As the balloon is removed, ammonia is lost from the wood panel and is absorbed in the concentrated sulfuric acid bath, as indicated by air being taken into the box and bubbling through the sulfuric acid pan. After one hour, the wood panel is dipped in the film forming polymer solution, removed, permitted to drain, and is placed on end, leaning against one side of the box. The wood panel is left in this position for 30 minutes, sufficient for complete drying of the film coating on the wood and thereafter, the cover of the box is removed and the wood panel is removed from the box. The wood panel is observed to have retained its flexibility and can be handled and stored for prolonged periods of time while still retaining the flexibility characteristic of cardboard.

EXAMPLE 3

A form is prepared for the outside corner of a small box in which the radius of the curvature is 0.5 inch. The flexible panel of bass wood prepared in Example 1 is placed on the corner and hand pressed into a shape conforming to the mold. The rubber latex film on the bass wood panel is stripped using a solvent and an ammoniacal odor is observed as the ammonia is released from the wood. The wood panel is clamped to the mold and retained in the clamped configuration for a period of 1 hour and thereafter the clamps are removed and the wood panel is observed to have taken a permanent shape conforming to the outside corner of the mold which is a compound curvature with a minimum radius of 0.5 inch. The wood panel is rigid with a permanent deformation corresponding to the curvature of the mold.

EXAMPLE 4

A shell mold is prepared with positive and negative mold plates. The shell mold is 5 inches square and the curvature of the shell has a minimum value of 0.5 inch. The negative and positive mold plates fit together with stand off legs which provide a separation gap (mold cavity) of approximately 1/16th of an inch, corresponding to the thickness of a wood panel.

A basswood panel prepared as described in Example 2 is washed with solvent to strip the coating and immediately placed between the negative and positive mold plates. The mold plates are clamped and pressed together with C-clamps until the stand off legs bottom against the opposite mold pattern. The clamped mold is left in the clamped condition for 1 hour and the clamps are then removed and the wood panel is removed and observed to have acquired a permanent shape of a shell, identically conforming to the pattern of the mold. The bass wood pattern has all the properties and conditions of the original wood panel and can be glued, sanded and stained as the untreated wood.

The preceding procedures of examples 1 and 2 are repeated with walnut, mahogany, cherry, white oak and red oak panels all of 1/16 to 1/8 inch thickness and the same results are observed.

EXAMPLE 5

A flexible walnut panel 1/16th in thickness and 6×8 inches is prepared as described in Example 1. The panel is then covered with a polyvinyl chloride shrinkable film 1 mil in thickness. The film covering is sealed about its edges and hot air is blown against the shrinkable film to shrink the film tightly about the panel. Thereafter, the wood panel can be stored/handled for extended periods of time without any loss of its flexible character.

EXAMPLE 6

A panel of white oak, 11 inches by 16 inches and 1/4 inch thick is placed in a humidification chamber and maintained at 100% relative humidity for two days, sufficient to adjust its moisture content to 18 percent. A pressure chamber 12 inches in diameter and 36 inches long having a removable end secured by bolted ring flanges is used for the pressure ammoniation of the wood panel. The flanged end is removed, and the wood panel is placed in the pressure chamber. The chamber is closed, and evacuated with a vacuum pump to a pressure of 10 mm. Hg. Anhydrous ammonia is added to atmospheric pressure, and the chamber is again evacuated with the vacuum pump. Anhydrous ammonia is then added and the pressure in the chamber is raised to 115 psig. with anhydrous ammonia. The panel is maintained in the chamber for 1 hour at ambient temperature (75° F.), and thereafter ammonia is released from the chamber, the chamber is opened, the wood panel is removed and immediately placed in the isolation box described in EXAMPLE 1. The isolation box is prepared in advance by placing a cup filled with an anhydrous vinylidene/vinyl chloride copolymer coating solution in the chamber, together with a brush. The isolation box is closed, the air within the box is displaced in the manner described in Example 1, and the box is filled with dry air, supplied to the box through a concentrated sulfuric acid bath.

The treated wood is brushed with a coating of the polyvinylidene/vinyl chloride copolymer which is permitted to cure to a film coating of approximately 1.5 mils thickness. The box is then opened, the wood is removed and immediately coated with an aqueous suspension of polyvinyl alcohol which cures to a film coating within a period of 2 hours.

The treated and coated wood is highly flexible and retains it flexibility over an extended period of time.

EXAMPLE 7

Example 6 is repeated with a panel of maple of substantially the same dimensions as the oak panel used in EXAMPLE 6. The procedure is changed, however, to evacuate the pressure chamber after the first hour of treatment with ammonia to strip any ammonia which is combined with water from the wood. The chamber is maintained at 20 mm. Hg. pressure for one hour, ammonia is then added to the chamber to a pressure of 115 psig. and maintained at that pressure for one hour. The chamber is then depressured and evacuated, and then raised to atmospheric pressure by slowly bubbling air through a concentrated sulfuric acid bath and into the chamber. This removes residual ammonia from the wood while avoiding introduction of water vapor. The chamber is opened and the wood panel is immediately transferred to the isolation box described in EXAMPLE 1, which is free of water vapor. The procedure of coating the wood panel with the vinylidene chloride and vinyl chloride copolymer coating solution and with a polyvinyl alcohol coating composition described in EXAMPLE 6 is repeated. The wood panel maintains flexibility for several months.

The invention has been described with reference to the illustrated and presently preferred embodiment. It is not intended that the invention be unduly limited by this disclosure of the presently preferred embodiment. Instead, it is intended that the invention be defined, by the means, and their obvious equivalents, set forth in the following claims:

What is claimed is:

1. A flexible wood article which comprises:

a. a wood article having exterior surfaces and impregnated with anhydrous ammonia in sufficient quantities to impart flexibility to said wood article; and b. a flexible polymeric film impermeable to ammonia and overlying said exterior surfaces as a coating on said wood article as a polymeric film to seal said exterior surfaces, thereby retaining said ammonia within said wood article.

2. The product of claim 1 wherein said polymeric film is a cured polymeric film coating on said exterior surfaces of said wood article.

3. The product of claim 2 wherein said polymeric film is polyvinyl alcohol.

4. The product of claim 2 wherein said polymeric film is a copolymer of vinylidene chloride and vinyl chloride.

5. The product of claim 1 wherein said polymeric film is a preformed film.

6. The product of claim 1 wherein said polymeric film is a heat shrinkable film.

7. A flexible wood product which comprises:

a. a wood article having exterior surfaces and impregnated with anhydrous ammonia in sufficient concentration to remove chemically bound water therefrom, and thereby impart flexibility thereto; and b. a polymeric film impermeable to water vapor coating the entirety of said exterior surfaces to seal the surfaces thereof and thereby prevent the internal bonding of water with the cellulose of the wood.

8. The product of claim 7 wherein said polymeric film former is polyvinyl alcohol.

9. The product of claim 7 wherein said polymeric film is a preformed film.

10. The product of claim 9 wherein said polymeric film is a heat shrinkable film said exterior.

* * * * *